United States Patent
Mickelsen

(10) Patent No.: US 11,012,719 B2
(45) Date of Patent: May 18, 2021

(54) APPARATUS, SYSTEMS AND METHODS FOR CONTROL OF SPORTING EVENT PRESENTATION BASED ON VIEWER ENGAGEMENT

(71) Applicant: DISH Technologies L.L.C., Englewood, CO (US)

(72) Inventor: Jeremy Mickelsen, Denver, CO (US)

(73) Assignee: DISH Technologies L.L.C., Englewood, CO (US)

( * ) Notice: Subject to any disclaimer, the term of this patent is extended or adjusted under 35 U.S.C. 154(b) by 556 days.

(21) Appl. No.: 15/063,944

(22) Filed: Mar. 8, 2016

(65) Prior Publication Data

US 2017/0264920 A1  Sep. 14, 2017

(51) Int. Cl.
| | |
|---|---|
| *H04N 21/218* | (2011.01) |
| *H04N 21/845* | (2011.01) |
| *H04N 21/439* | (2011.01) |
| *H04N 21/4223* | (2011.01) |
| *G06K 9/00* | (2006.01) |
| *H04N 21/442* | (2011.01) |

(Continued)

(52) U.S. Cl.
CPC ... *H04N 21/21805* (2013.01); *G06K 9/00302* (2013.01); *G06K 9/00335* (2013.01); *G06K 9/00724* (2013.01); *G06K 9/00771* (2013.01); *H04N 21/4223* (2013.01); *H04N 21/42203* (2013.01); *H04N 21/4394* (2013.01); *H04N 21/44008* (2013.01); *H04N 21/44218* (2013.01); *H04N 21/4532* (2013.01); *H04N 21/8456* (2013.01)

(58) Field of Classification Search
None
See application file for complete search history.

(56) References Cited

U.S. PATENT DOCUMENTS 6,144,375 A * 11/2000 Jain ................... G06F 17/30017
345/420
6,177,931 B1 * 1/2001 Alexander ......... G06Q 30/0269
348/565

(Continued)

FOREIGN PATENT DOCUMENTS

WO    2007090173 A2    8/2007

OTHER PUBLICATIONS

"Media Consumption Ad Targeting & TV Synched Companion Ads." Audible Magic. Web. Sep. 20, 2015. <https://www.audiblemagic.com/wp-content/uploads/2014/02/AudibleMagic_TVSynchedAds_Datasheet.pdf>.

(Continued)

*Primary Examiner* — An Son P Huynh

(57) ABSTRACT

Systems and methods are operable to present a sporting event on a display based on a determined level of viewer engagement and a determined team preference of the viewer. An exemplary embodiment presents a neutral viewpoint video content segment on the display during the first period of game play when the viewer has a neutral team preference, alternatively presents a first team alternative video content segment on the display during the first period of game play when the viewer has a preference for the first team, or alternatively presents a second team alternative video content segment on the display during the first period of game play when the viewer has a preference for the second team.

20 Claims, 6 Drawing Sheets

(51) Int. Cl.
*H04N 21/422* (2011.01)
*H04N 21/45* (2011.01)
*H04N 21/44* (2011.01)

(56) References Cited

U.S. PATENT DOCUMENTS

| | | | | |
|---|---|---|---|---|
| 7,085,844 B2* | 8/2006 | Thompson | ............ | G11B 27/105 386/E5.024 |
| 7,543,322 B1* | 6/2009 | Bhogal | .............. | H04N 5/44543 725/38 |
| 8,301,574 B2 | 10/2012 | Kilger et al. | | |
| 8,510,770 B1* | 8/2013 | Oztaskent | ................ | H04L 67/22 705/319 |
| 8,522,274 B2 | 8/2013 | Slaney et al. | | |
| 8,543,454 B2* | 9/2013 | Fleischman | ........ | G06Q 30/0201 705/14.44 |
| 8,667,519 B2* | 3/2014 | Small | ................ | H04N 21/4223 725/10 |
| 8,745,647 B1* | 6/2014 | Shin | ...................... | H04N 21/442 725/10 |
| 8,768,713 B2 | 7/2014 | Chaoui et al. | | |
| 8,769,557 B1* | 7/2014 | Terrazas | ........... | H04N 21/44218 725/12 |
| 8,776,149 B1* | 7/2014 | Koch | ................ | H04N 21/4334 725/37 |
| 8,850,502 B2* | 9/2014 | Tanaka | ................. | H04N 21/654 725/110 |
| 8,898,687 B2* | 11/2014 | Hulten | ................ | H04N 21/442 725/12 |
| 9,137,558 B2* | 9/2015 | Gibbon | ............ | H04N 21/42201 |
| 9,138,652 B1 | 9/2015 | Thompson | ........... | H04N 21/2358 |
| 9,253,533 B1 | 2/2016 | Morgan | ........... | H04N 21/44008 |
| 9,378,474 B1 | 6/2016 | Story, Jr. | | |
| 9,398,335 B2* | 7/2016 | Hough | ............ | H04N 21/4415 |
| 9,531,708 B2* | 12/2016 | Cornell | .............. | H04L 63/0861 |
| 9,736,503 B1* | 8/2017 | Bakshi | ............. | H04N 21/23424 |
| 2001/0040590 A1* | 11/2001 | Abbott | .................... | G06F 1/163 715/700 |
| 2003/0023452 A1* | 1/2003 | Novais | .................... | G06Q 30/02 348/211.11 |
| 2003/0033602 A1* | 2/2003 | Gibbs | ................... | G11B 27/28 725/46 |
| 2004/0098754 A1* | 5/2004 | Vella | ...................... | H04N 5/445 725/135 |
| 2004/0221311 A1* | 11/2004 | Dow | .................. | G06F 17/30784 725/52 |
| 2004/0261127 A1* | 12/2004 | Freeman | ................. | G03C 1/26 725/135 |
| 2005/0060641 A1* | 3/2005 | Sezan | ................ | H04L 12/2805 715/202 |
| 2005/0132401 A1* | 6/2005 | Boccon-Gibod | .... | G11B 27/002 725/34 |
| 2005/0137958 A1* | 6/2005 | Huber | .................. | G06Q 30/02 705/37 |
| 2005/0138658 A1* | 6/2005 | Bryan | .................... | H04H 60/27 725/46 |
| 2005/0289582 A1* | 12/2005 | Tavares | .............. | G06K 9/00221 725/10 |
| 2006/0218573 A1* | 9/2006 | Proebstel | ............. | H04H 60/33 725/14 |
| 2007/0079325 A1* | 4/2007 | de Heer | .............. | H04N 7/17318 725/32 |
| 2007/0154169 A1* | 7/2007 | Cordray | ............. | H04N 5/44543 386/230 |
| 2007/0157260 A1* | 7/2007 | Walker | .................. | H04N 7/163 725/86 |
| 2008/0040740 A1* | 2/2008 | Plotnick | ............... | G11B 27/005 725/32 |
| 2009/0082095 A1* | 3/2009 | Walker | .................. | G07F 17/32 463/25 |
| 2009/0150919 A1* | 6/2009 | Lee | .................... | H04N 7/17309 725/10 |
| 2009/0271256 A1* | 10/2009 | Toebes | ................... | G06Q 30/02 705/14.53 |
| 2010/0058395 A1* | 3/2010 | Goergen | ............ | H04N 7/17318 725/58 |
| 2011/0072452 A1* | 3/2011 | Shimy | .................... | H04N 7/163 725/25 |
| 2011/0078174 A1* | 3/2011 | Lee | .................... | H04N 5/44543 707/769 |
| 2011/0280434 A1* | 11/2011 | Mamidwar | .......... | H04N 21/235 382/100 |
| 2012/0254909 A1 | 10/2012 | Serdiuk | | |
| 2012/0278331 A1* | 11/2012 | Campbell | ........ | H04N 21/44204 707/740 |
| 2013/0006765 A1* | 1/2013 | Lee | .................. | H04N 21/44222 705/14.53 |
| 2013/0036200 A1* | 2/2013 | Roberts | ............... | H04L 65/4076 709/219 |
| 2013/0205314 A1 | 8/2013 | Ramaswamy et al. | | |
| 2013/0238394 A1* | 9/2013 | el Kaliouby | ........ | G06Q 30/0202 705/7.31 |
| 2013/0268955 A1* | 10/2013 | Conrad | ................ | H04N 21/252 725/12 |
| 2013/0282839 A1* | 10/2013 | Alcala | ................ | H04N 21/4788 709/206 |
| 2013/0326406 A1* | 12/2013 | Reiley | .................... | G06F 3/048 715/810 |
| 2014/0052534 A1* | 2/2014 | Gandhi | .................. | G06Q 50/01 705/14.58 |
| 2014/0062696 A1* | 3/2014 | Packard | ............... | G06Q 10/063 340/540 |
| 2014/0078039 A1 | 3/2014 | Woods et al. | | |
| 2014/0114919 A1* | 4/2014 | Woods | ............. | H04N 21/23109 707/634 |
| 2014/0122153 A1* | 5/2014 | Truitt | ................. | G06Q 10/1095 705/7.19 |
| 2014/0189517 A1* | 7/2014 | Hughes | ................. | G06F 3/04842 715/719 |
| 2014/0223482 A1* | 8/2014 | McIntosh | ............. | G11B 27/105 725/41 |
| 2014/0229996 A1* | 8/2014 | Ellis | ................... | H04N 5/44543 725/61 |
| 2014/0245367 A1* | 8/2014 | Sasaki | ................ | H04N 21/4402 725/109 |
| 2014/0250043 A1* | 9/2014 | Malinsky | ................. | G06N 5/02 706/46 |
| 2014/0280879 A1 | 9/2014 | Skolicki | | |
| 2014/0344265 A1* | 11/2014 | Boucher | ........... | G06F 17/30867 707/732 |
| 2014/0344839 A1* | 11/2014 | Woods | ................. | H04N 21/488 725/9 |
| 2015/0046828 A1 | 2/2015 | Desai et al. | | |
| 2015/0058780 A1* | 2/2015 | Malik | .................... | G06F 3/0481 715/772 |
| 2015/0067754 A1* | 3/2015 | Wiser | ................ | H04N 21/2668 725/120 |
| 2015/0082344 A1* | 3/2015 | Antalek | ............. | H04N 21/4722 725/34 |
| 2015/0106861 A1 | 4/2015 | Yu | | |
| 2015/0186368 A1* | 7/2015 | Zhang | ................ | G06F 17/3082 707/740 |
| 2015/0221336 A1* | 8/2015 | Deen | ................. | G11B 27/031 386/290 |
| 2015/0235672 A1* | 8/2015 | Cudak | ................ | G11B 27/3081 386/241 |
| 2015/0319470 A1* | 11/2015 | Tang | .................... | H04N 21/2668 725/34 |
| 2015/0350729 A1* | 12/2015 | Reynolds | ........... | H04N 21/4668 725/34 |
| 2015/0358690 A1* | 12/2015 | Thompson | ........ | H04N 21/25891 725/32 |
| 2015/0375117 A1* | 12/2015 | Thompson | .............. | A63F 13/35 463/9 |
| 2016/0014461 A1* | 1/2016 | Leech | ................ | H04N 21/4668 725/14 |
| 2016/0037217 A1* | 2/2016 | Harmon | ............ | H04N 21/45457 725/9 |

(56) References Cited

U.S. PATENT DOCUMENTS

| | | | |
|---|---|---|---|
| 2016/0105708 A1* | 4/2016 | Packard | H04N 21/23439 725/10 |
| 2016/0105733 A1* | 4/2016 | Packard | H04N 21/8549 725/32 |
| 2016/0127766 A1* | 5/2016 | Luk | H04N 21/4335 386/248 |
| 2016/0345062 A1* | 11/2016 | Klappert | H04N 21/4667 |
| 2016/0353168 A1* | 12/2016 | Allen | H04N 21/4627 |
| 2016/0353252 A1* | 12/2016 | Krasadakis | H04W 4/06 |
| 2017/0134803 A1* | 5/2017 | Shaw | H04N 21/44218 |

OTHER PUBLICATIONS

Colaco, Andrea, Ig-Jae Kim, and Chris Schmandt. "Back Talk: An Auditory Environment for Sociable Television Viewing." 2011 IEEE Consumer Communications and Networking Conference (CCNC) (2011).

Laker, Freddie. "Smart TV Security: When TV Watches You." N.p., Aug. 27, 2013. Web. Sep. 20, 2015.

\* cited by examiner

APPARATUS, SYSTEMS AND METHODS FOR CONTROL OF SPORTING EVENT PRESENTATION BASED ON VIEWER ENGAGEMENT

BACKGROUND

Media devices, such as a set top box, a stereo, a television, a computer system, a game system, or the like, are often configured to present media content pertaining to a sporting event. Conventional presented media content for a sporting event is broadcast out to a plurality of media devices.

Typically, a plurality of different cameras located about the sporting event location are operated to capture video images of the play of the sporting event from different camera viewing angles. During production of the broadcasting sporting event, one of the plurality of cameras is selected to provide the broadcasting video content of the ongoing sporting event. When play of the sporting event has stopped, the one or more of the cameras may be oriented about the field of play towards other locations, such as the sidelines of the playing field or towards other areas of activity, such as when cheerleaders are presenting a cheer or the like. Thus, when play has stopped, selected video from one or more of these cameras are selected for presentation to the viewers of the sporting event.

Alternatively, some other content may be substituted into the broadcast of the sporting event, such as commentary about the previous play, commentary about some other aspect of the game or sporting event, and/or commentary about the teams and/or a particular player of interest. The video portion of such commentary may present images of the commentators who are providing the commentary, and/or may present video images of replays of the sporting event that is the subject matter of the commentary. Alternatively, or additionally, pre-filmed or previously acquired content (such as a still image or a video of a particular player) may be presented during the commentary.

However, since the sporting event is likely to be broadcast to viewing audiences who are fans of one team or who are fans of the other team, the broadcasted sporting event typically presents a neutral, one-dimensional viewpoint of the sporting event. Typically, a team-neutral viewpoint is taken by the producer of the media content so as to present an even-handed neutral viewpoint that is not biased in favor of either team. Accordingly, presentation of the sporting event is made without favor to one team or the other (a neutral presentation viewpoint).

Thus, one problem encountered in the prior art is that a broadcasting sporting event that presents a neutral viewpoint can be less interesting to the fans of one team or the other. That is, a fan of a particular team would otherwise have a higher degree of enjoyment if the presentation of the sporting event was biased towards their favorite team. However, such a biased presentation would likely be less enjoyable to fans of the opposing team of the sporting event.

Further, many viewers may not be partial to one team or the other of a particular broadcasting sporting event. Rather, such viewers may equally prefer, or not have a significant preference for, one team or the other. Such viewers may be watching the sporting event because they enjoy watching the sporting event in and of itself. Thus, a biased presentation favoring one team or the other would likely be distracting to such neutral-biased viewers.

Accordingly, there is a need in the arts to present a broadcast of a sporting event that has a higher degree of enjoyment to the viewing fan, regardless of their bias towards one team or the other (or if they have an unbiased interest in the sporting event).

SUMMARY

Systems and methods are operable to present a sporting event on a display based on a determined level of viewer engagement and a determined team preference of the viewer. An exemplary embodiment presents a neutral viewpoint video content segment on the display during the first period of game play when the viewer has a neutral team preference, alternatively presents a first team alternative video content segment on the display during the first period of game play when the viewer has a preference for the first team, or alternatively presents a second team alternative video content segment on the display during the first period of game play when the viewer has a preference for the second team.

BRIEF DESCRIPTION OF THE DRAWINGS

Preferred and alternative embodiments are described in detail below with reference to the following drawings.

DETAILED DESCRIPTION

Figure 1:
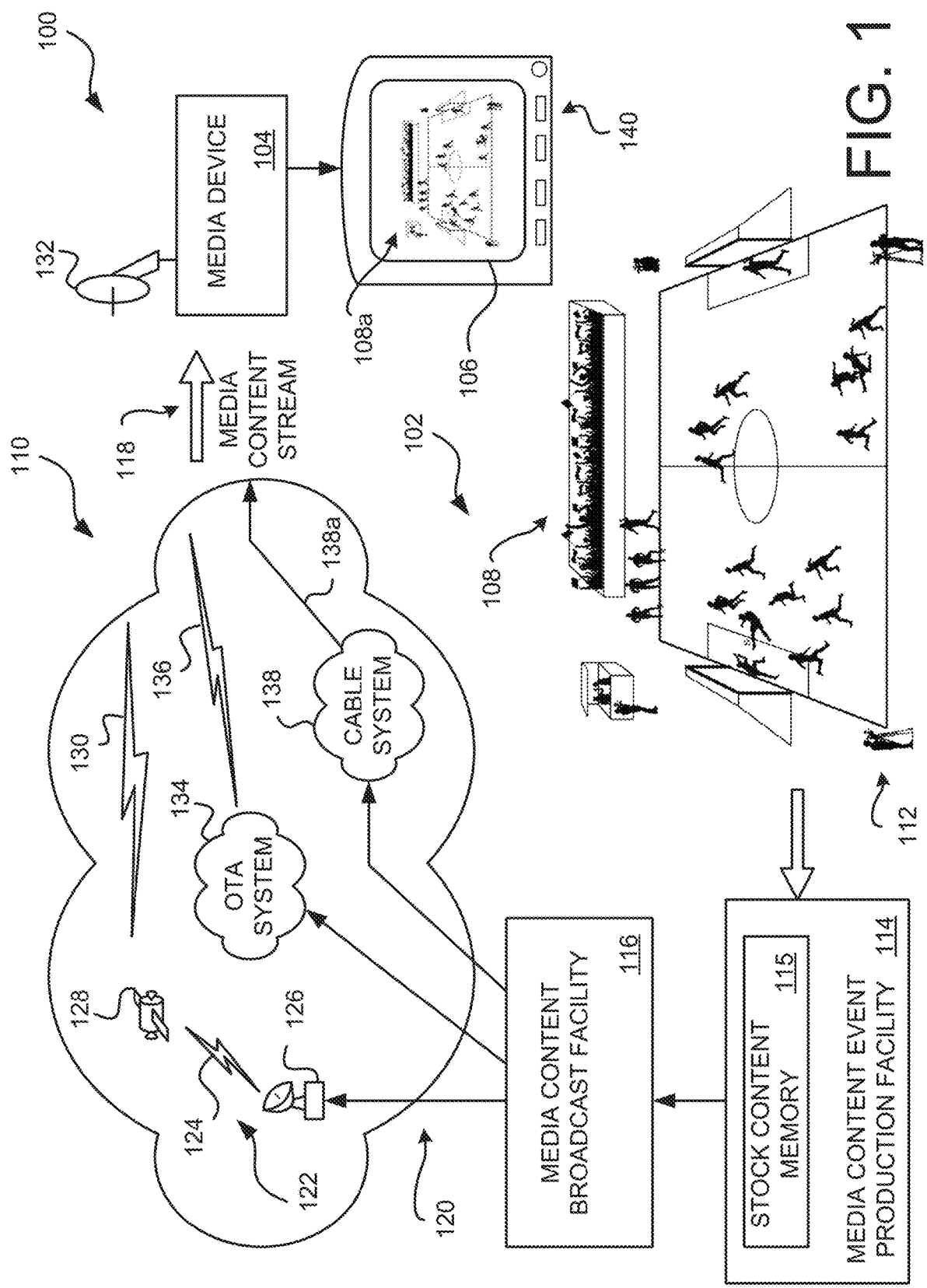
FIG. 1 is a block diagram of an embodiment of a sporting event presentation system implemented in a media presentation system media that produces and communicates sporting event media content to a plurality of media devices.

FIG. 1 is a block diagram of an embodiment of a sporting event presentation system 100 implemented in a media production and presentation system 102 that produces and communicates sporting event media content to a plurality of media devices 104. Non-limiting examples of media devices 104 include, but are not limited to, a set top box (STB), a television (TV), a smart phone or other cellular communication device, a net book, a laptop computer, or a personal computer (PC) that is configured to receive broadcasting media content that is presented on a display 106.

Embodiments of the sporting event presentation system 100 detect viewer engagement responses of one or more viewers watching the presented sporting event 108 on the display 106. Based on the detected viewer engagement responses, a level of viewer engagement relating to currently presented portions of the presented sporting event 108 is determined. Further, a preference for one of the teams is determined based on the detected viewer engagement responses. Then, presentation of the sporting event 108 is managed based on the determined level of viewer engagement. For example, if a highly engaged viewer is a fan of a particular team, alternative content may be presented about that favored team.

For example, a sporting event 108, conceptually illustrated as a football game, is illustrated in FIG. 1. The illustrated sporting event 108 is used to conceptually describe operation of various embodiments of the sporting event presentation system 100. During play of the sporting event 108, video images and audio content are captured and processed into streaming video and audio content. The produced audio and video representation of the sporting event 108 is referred to herein as the sporting event production. The sporting event production is then communicated to the plurality of media devices 104.

An image of the video portion of the sporting event production is presented as an image 108*a* on the display 106. The sporting event production may be presented on the display 106 in real time, or in near real time (in view or processing time required to capture, produce and communicate the audio and visual representation of the sporting event 108 to the media devices 104). Alternatively, the sporting event production may be stored in a media device 104 for later presentation to a user of the media device 104 (interchangeably referred to herein as a viewer).

In most game situations, the sporting event 108 is a competitive event typically held between two different teams. The viewer may have a preference for a first team over a second team that is competing in the sporting event 108. The determined level of viewer engagement enables the sporting event presentation system 100 to identify a particular viewer's preference for one team over the other team (or determine that the viewer does not have a preferred team). Based on the determined level of viewer engagement, presentation of content of the sporting event production is modified to present a viewpoint that enhances the viewer's enjoyment of the presented sporting event 108. That is, presentation of alternative content included in the sporting event production is varied to present more interesting video and/or audio content that is more likely to be enjoyed by the viewer. Depending on how the sporting event production is created, the alternative video and/or audio content of the sporting event production may present different camera angle views, play replays, play commentary, or other information of interest pertaining to the viewer's preferred team.

To illustrate, consider a hypothetical first viewer of a sporting event production who favors a first team. As presentation of the sporting event 108 progresses, the first team may complete an unusual and interesting game play. For this first viewer, one or more replays of the game play of interest, here alternative content, may be presented to that first viewer.

Concurrently, a second viewer may be also watching the same sporting event production who favors the other second team. It is likely that the second viewer is not going to particularly enjoy viewing a plurality of replays that is presented to the first user. Here, embodiments of the sporting event presentation system 100, based on the determined level of viewer engagement of the second viewer, will select and present different alternative content to the second viewer. For example, but not limited to, images of other areas of the game play field may be presented to this second viewer (such as the second team's cheerleading squad, the second teams player bench, or of the crowd attending the sporting event 108).

As another non-limiting example of alternative content, advertisements for upcoming presentation of sporting events with different teams may be presented to this third viewer. Such advertisements may pertain merchandise related to the identified favorite team. Alternatively, or additionally, advertisements for products, for services and/or for upcoming presentation of other sporting events for the second team may be presented.

Concurrently, a third viewer may be also watching the production of the same sporting event 108 who favors neither the first team or the second team. Embodiments of the sporting event presentation system 100, based on the determined level of viewer engagement of the third viewer, will select and present content that is different from the alternative content presented to the first viewer and/or the second viewer. For example, but not limited to, content corresponding to a neutral presentation viewpoint, which may correspond to a conventional live broadcast, may be presented to this third viewer when then this viewer is neutral in their preference to either team (interchangeably referred to herein as having a neutral team preference).

As another non-limiting example of alternative content, a stock of content or pre-produced content may be selected for presentation to viewers based on the determined level of viewer engagement. For example, pre-produced special interest segments about particular teams, about team home locations, about locations in proximity to the game play field, or other topics of interest may be selected as alternative content. Here, such pre-produced alternative content may be stored in the stock content memory 115 at the media content event production facility 114, which may be implemented as part of a processing system with suitable memory for storing and accessing the pre-produced content. In some embodiments, the pre-produced content may reside in a remote memory medium and be accessed as needed as the production of the same sporting event 108 is created by the producers.

To facilitate disclosure of an exemplary embodiment of the sporting event presentation system 100, operation of an exemplary media content transport system 110 that provides media content to an example media device 104 is disclosed. During play of the sporting event 108, a plurality of image capture devices 112 at different locations around the field of play capture video images (and optionally audio content). The image capture devices 112 are operated by a cameraman who dynamically orients their image capture device towards different regions of the field of play to capture play of the sporting event 108. Alternatively, or additionally, the cameraman may orient their image capture device 112 to capture other content of interest in proximity to the field of play, such as a scoreboard, fans in the stadium, or the like.

Each of the image capture devices 112 provide a stream of media content (video content, and optionally audio content) to a media content event production facility 114, which may be in proximity to the field of play or which may be at a remote site. Operators within the media content event production facility 114 process the received steams of media content received from the image capture devices 112 into the sporting event production.

A media content broadcast facility 116 operated by a media content provider receives the sporting event production from the media content event production facility 114. Further, the media content broadcast facility 116 receives media content from a plurality of other content producers. For example, the other media content may include, but is not limited to, television programs, newscasts, different broadcasting sporting events, movies, or the like. The media content is typically provided to the media content broadcast facility 116 in the form of media content streams that include a stream of video content and a synchronized stream of audio content.

The media content broadcast facility 116 processes the received media content streams as necessary to prepare them for transmission to the customers (the users or viewers of the plurality of media devices 104) into a media content stream 118 that is received by each of the plurality of media devices 104. For example, commercials or the like may be incorporated with a particular one of the media content streams. Alternatively, or additionally, the media content streams may be associated with identifiers, such as channel number and/or station call signs associated with the producers of the media content.

In an example media content transport system 110, selected ones of the media content streams are bundled (aggregated, interleaved together, etc.) into one or more transport channels 120. Then, the one or more of the transport channels 120 are communicated to the media devices 104.

A variety of types of communication systems may be used to communicate the transport channels 120 and/or the media content stream 118 to the media devices 104. The media content transport system 110 may employ a satellite system 122 wherein an uplink signal 124 is communicated from a ground antenna 126 up to one or more satellites 128. Each of the exemplary satellites 128 broadcast a wireless satellite signal 130 down to a receiver antenna 132 that is coupled to the media device 104. The media device 104 receives the media content stream 118 from the receiver antenna 132.

Alternatively, or additionally, the media content transport system 110 may employ an over the air (OTA) system 134 wherein a communicated wireless signal 136 is received by the receiver antenna 132. The media device 104 then receives the media content stream 118 from the receiver antenna 132.

Alternatively, or additionally, the media content transport system 110 may employ a cable system 138 wherein a wire-based signal is communicated using a suitable cable 138a or the like that is coupled to the media device 104. Non-limiting examples of the cable 138a include a fiber optic cable, a coaxial cable, and telephone line.

The media content stream 118 may also be received by the media device 104 in other manners. In an exemplary embodiment, the media content broadcast facility 116 or the media content event production facility 114 may be communicatively coupled to the media device 104 via another communication system (not shown). The media content stream 118 may then be received by the media device 104 via a communication link that establishes connectivity of the media device 104 to the media content broadcast facility 116 and/or the media content event production facility 114. A non-limiting example of such a communication system is the Internet.

The sporting event production in the received media content stream(s) 118 may be selected by the user who provides suitable instructions to the media device 104. The sporting event production may be identified by its particular "channel" and/or station call sign. The media device 104 tunes itself to the particular transport channel 120 on which the sporting event production is available, and then retrieves the selected sporting event production. The sporting event production is then assembled into the stream of video and audio content and is communicated from the media device 104 to one or more components of a media presentation system 140, such as the example television (TV) with the display 106.

Figure 2:
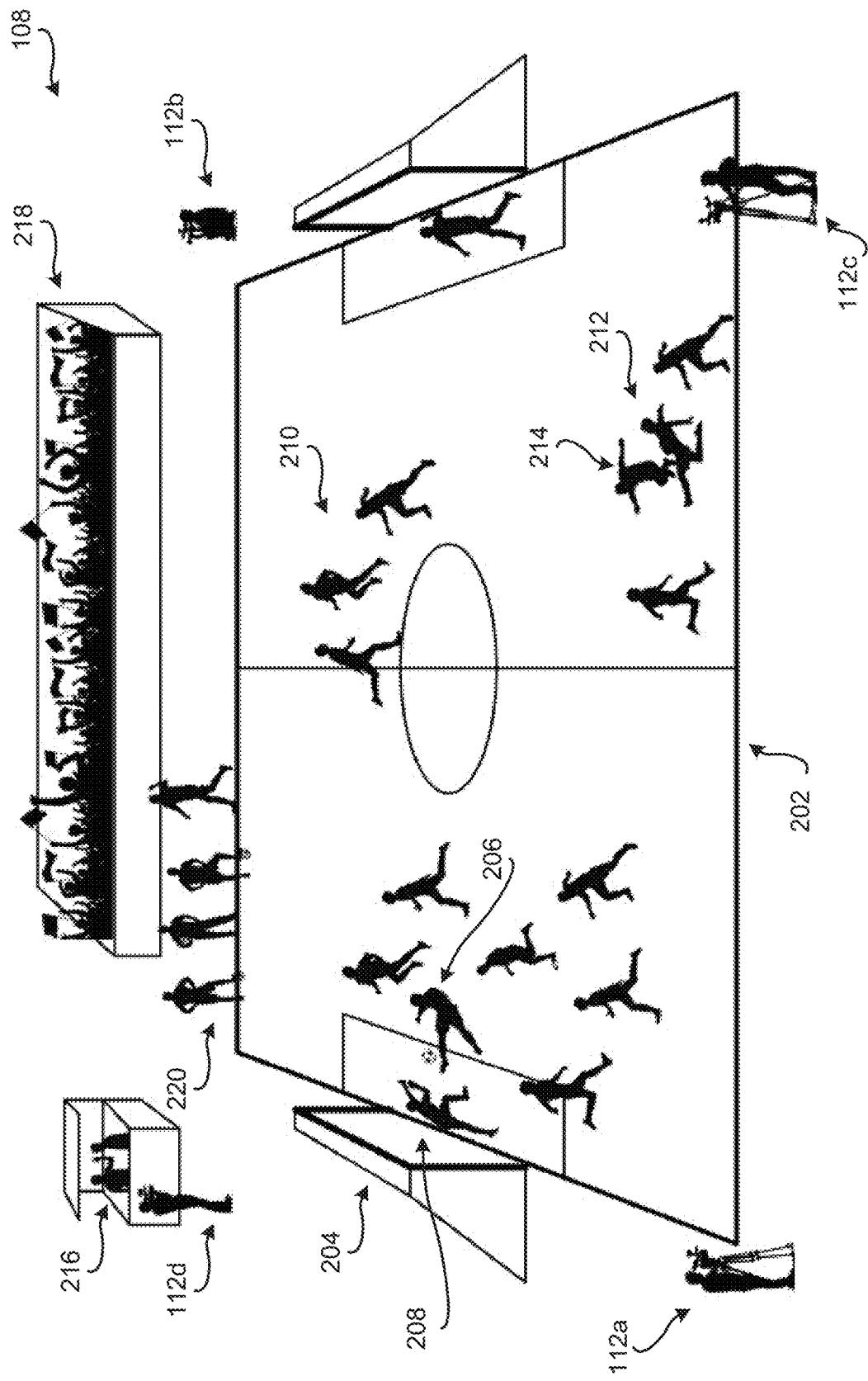
FIG. 2 is a conceptual diagram of the hypothetical sporting event of FIG. 1.

FIG. 2 is a conceptual diagram of the hypothetical sporting event 108 of FIG. 1. This simplified conceptual still image of the sporting event 108, a soccer game, is illustrated and described to conceptually describe an example operating environment wherein embodiments of the sporting event presentation system 100 present selected video and/or audio content of the sporting event production pertaining to the viewer's preferred team, wherein the viewer's preference is based on the determined level of viewer engagement. Accordingly, one skilled in the art appreciates that the conceptual still image of the sporting event 108 corresponds to an instant in time during play of the sporting event 108, and that the plurality of image capture devices 112a-d (interchangeably referred to as movie cameras) are each capturing a video image (and optionally audio content) of game play during the duration of the sporting event 108.

The sporting event 108 is being played on the playing field 202. During play of the sporting event 108, cameramen are illustrated as capturing video images (and/or audio content) using their image capture device 112a-d, respectively. Each of the image capture devices 112a-d are at different locations around the playing field 202. Accordingly, the field of view (or camera angle) of each captured stream of video content will be different based on the particular location of the image capture device 112a-d and the orientation (direction) of the particular image capture device 112a-d. That is, each of the image capture devices 112a-d are appreciated to be capturing video of the sporting event 108 at different camera angles.

The conceptual still image of the sporting event 108 shows a plurality of players near the goal net 204. Here, a player 206 from a first team is illustrated as taking a shot, or kicking the soccer ball, towards the goal net 204. A defending player 208 from the second team is illustrated as attempting to block the shot made by the player 206. The first cameraman operating the first image capture device 112a, located at the lower left-hand corner of the playing field 202, is illustrated as capturing play of the game from a first camera view angle.

Concurrently, a second cameraman operating the second image capture device 112b, located at the upper right-hand corner of the playing field 202, is also capturing play of the game from a second camera view angle. However, a group of other players 210 illustrated as playing in the central area of the playing field 202 may be obstructing the view of the goal shot in the video captured by the second image capture device 112b. Thus, it is more likely that the video stream being captured by the first image capture device 112a at the time of the shot on goal will be used in the sporting event production rather than the video stream being concurrently captured by the second image capture device 112b (since presenting a clear unobstructed view of the goal shot captured by the first image capture device 112a is more desirable than presenting the obstructed view of the goal shot using the video image captured by the second image capture device 112b). It is appreciated that as game play progresses, the producers of the sporting event production will selectively choose among the various streams of video content (an optionally the audio content) being captured by the image capture devices 112a-d to produce the sporting event production that is presented to the viewers of the media devices 104.

Further, a plurality of other players are illustrated in the lower right-hand side of the playing field 202. Here, a third player 212 of the first team is illustrated as tripping a fourth player 214 of the second team, thereby likely causing a foul play that is likely to be penalized. A third cameraman operating a third image capture device 112c is illustrated as capturing a video of this potential penalty play.

A fourth cameraman operating a fourth image capture device 112d is conceptually illustrated as capturing video images of one or more commentators 216 who are narrating play of the sporting event 108 for the crowd and/or for the viewers of the media devices 104. It is appreciated that as game play progresses, the producers of the sporting event production will selectively choose to present the stream of video content being captured by the image capture device 112d, likely during temporary stops of game play, so that the viewers may hear the dialogue of the commentators 216 (and optionally view the commentators 216 from time to time). Further, it is appreciated that the dialogue of the commentators 216 during game play may be combined with the video content and/or audio content captured by the other image capture devices 112a-c during game play.

As play progresses, assume that the goal shot made by the first player 206 was successful, thereby resulting in a game point for the first team. Following the goal shot, it is likely that the fans 218 attending the sporting event 108 are likely to be cheering. It is likely that a first viewer watching the sporting event 108 using their media device 104 (who is a determined to be fan of the first team based on the determined level of viewer engagement) may be very interested in viewing the reaction of the cheering fans 218. Here, the second cameraman operating the second image capture device 112b may be instructed to re-orient the image capture device 112b towards the cheering fans 218, wherein a video of the cheering fans 218 would then be available to present to the first viewer as alternative content.

Further, assume that a second viewer watching the sporting event 108 using their media device 104 is a fan of the second team. Here, it is not likely that the second viewer wants to watch the cheering fans 218. Rather, other alternative content may be presented to the second viewer (rather than the video content of the cheering fans 218 that is of interest to the first viewer).

It is appreciated that as game play progresses, and based on any suitable number of image capture devices 112 recording the sporting event 108, that the possible variations of content based on particular interests of the individual viewers watching the sporting event production using their media devices 104 are nearly limitless. With the sporting event presentation system 100, individual video streams of interest may be selected and presented to a viewer based on the particular interests of that particular viewer, in accordance with the determined level of viewer engagement.

Figure 3:
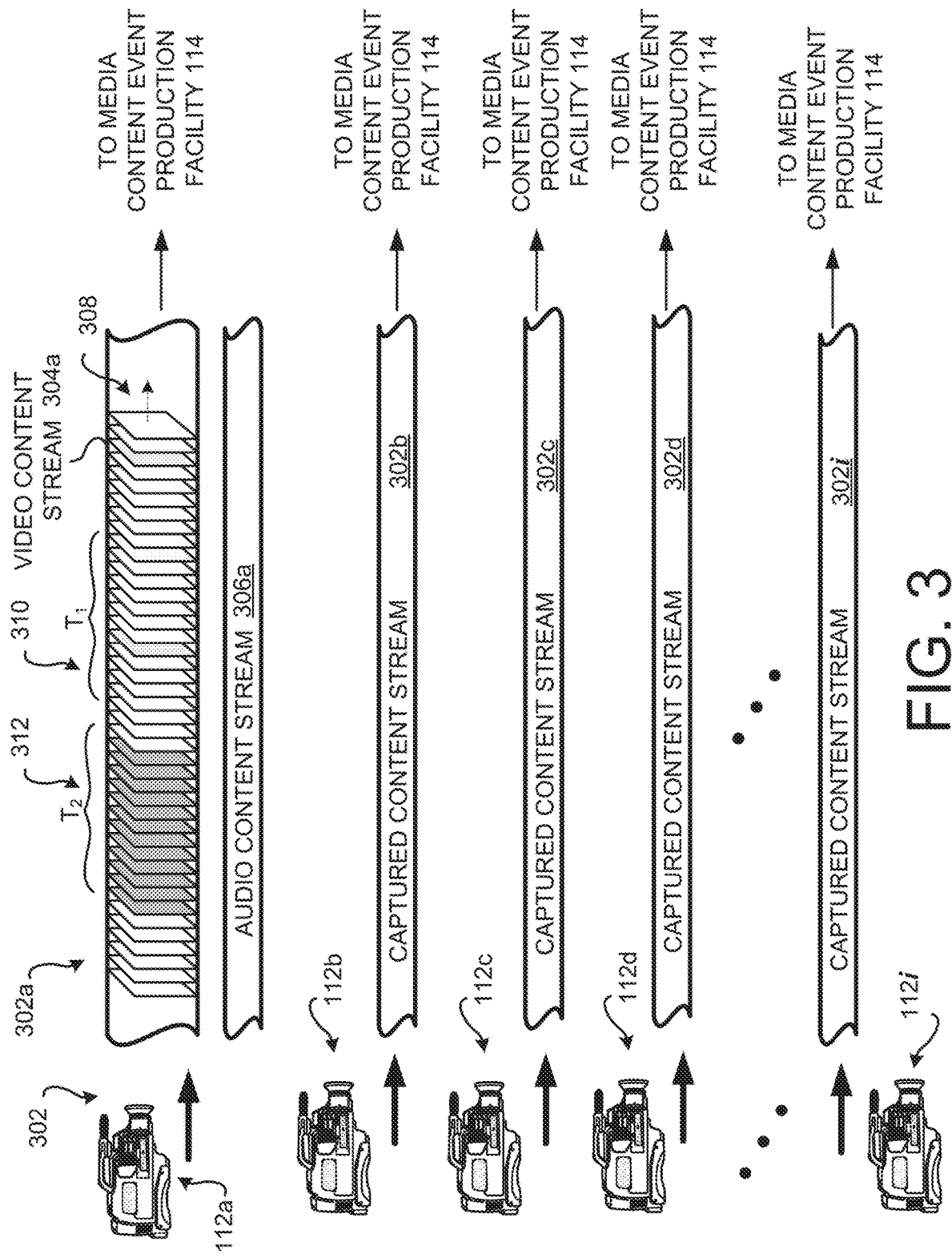
FIG. 3 is a conceptual diagram of the content streams output from a plurality of the image capture devices of FIG. 1.

FIG. 3 is a conceptual diagram of the content streams 302 output from a plurality of the image capture devices 112a-112i of FIG. 1. For example, the output content stream 302a from the image capture device 112a comprises a video content stream 304a and an audio content stream 306a. The video content stream 304a output from the image capture device 112a comprises a series of sequenced still images 308 (interchangeably referred to herein as a video frame 308).

When presented on the display 106 (FIG. 1), the viewer perceives a moving image of the objects in the series of presented video frames 308. The image objects are appreciated to lie in the field of view of the image capture device 112a. When the audio content stream 306a is synchronously presented with the video content stream 304a, the viewer hears sounds and/or dialogue as captured by one of the image capture device 112a in synchronism with the presented video image.

As each of the content streams 302a-i are output from respective ones of the image capture devices 112a-i, the streaming output content is communicated to the media content event production facility 114. Operators at the media content event production facility 114 process the received content streams 302a-i. Here, an operator viewing and/or listening to content of the incoming content streams 302a-i selectively chooses portions (interchangeably referred to herein as a segment) from the received content streams 302 (video and/or audio) for inclusion in the sporting event production. For example, when the player 206 scores a point during game play, multiple ones of the image capture devices 112a-i may have captured (interchangeably referred to as filmed) a video of the game play. The operator selects one a portion of one of the content streams 302a-i which has a "most preferable" field of view of that particular game play, and then adds that portion of the content stream 302 (the video content and optionally the audio content) to generate the sporting event production there from. If the audio content of that selected portion of the content stream 302 is not included in the sporting event production, audio content from another source may be used. For example, the audio portion of the speaking commentators 216 may be used while the video portion of the filmed game play is selected for the sporting event production, With respect to the hypothetical sporting event 108 conceptually described above and illustrated in FIGS. 1-2, assume that a first segment 310 (the series of video frames 308) was captured during the duration of game play when the player 206 of the first team made the successful goal shot that the second player 208 was defending against. This period of game play presented during this first segment 310 is denoted by the duration $T_1$ in FIG. 3. After completion of the successful goal shot, a following second segment 312 of the video frames 308 was captured by the image capture device 112a. This next period of game play presented during this second segment 312 is denoted by the duration $T_2$.

During production of the sporting event content, one skilled in the art appreciates that the first segment 310 would be processed for inclusion in the sporting event production, and that the second segment 312 would likely not be included in the sporting event production (since viewers would not likely be interested in the activity in the vicinity of that area of the playing field 202). Rather, video content segments captured by other ones of the image capture devices 112b-i, or alternative content segments, would then follow the presentation of the first segment 310 in the sporting event production that is communicated to the media devices. For example, if the second image capture device 112b is re-oriented towards the cheering fans 218, a video segment corresponding to the duration $T_2$ of the cheering fans 218 might then be included in the sporting event production. Alternatively, or additionally, the video content and/or the audio content being captured by the fourth image capture device 112d (corresponding to the duration $T_2$) of the commentator 216 who is narrating play of the sporting event 108 might be the next included segment of the sporting event production.

During production of a legacy sporting event, the producers would be limited to generating a sporting event production content stream having a single video content stream and a corresponding audio content stream. Although a plurality of different image capture devices 112a-i are used to capture game play, the operator must select segments from the available content streams 302a-i. (In some instances, a picture in picture format, or other suitable multiple image format, may be used to concurrently present video content from multiple ones of the image capture devices 112a-i. However, the multiple content streams are processed into a single stream of video content as the sporting event production is being generated.)

Embodiments of the sporting event presentation system 100 are not so limited. Here, operators at the media content event production facility 114 have the option of selecting a plurality of different segments for inclusion in the sporting event production. Here, each different segment is captured by ones of the image capture devices 112*a-i*. Each selected segment is associated with a particular viewpoint (the segment is referred to interchangeably as a viewpoint video segment). Then, the selected multiple viewpoint video segments are communicated together as part of the sporting event production, wherein each of the viewpoint video segments are different streams of video content. Further, the sporting event production may optionally include one or more selected audio stream segments in the generated sporting event production.

Figure 4:
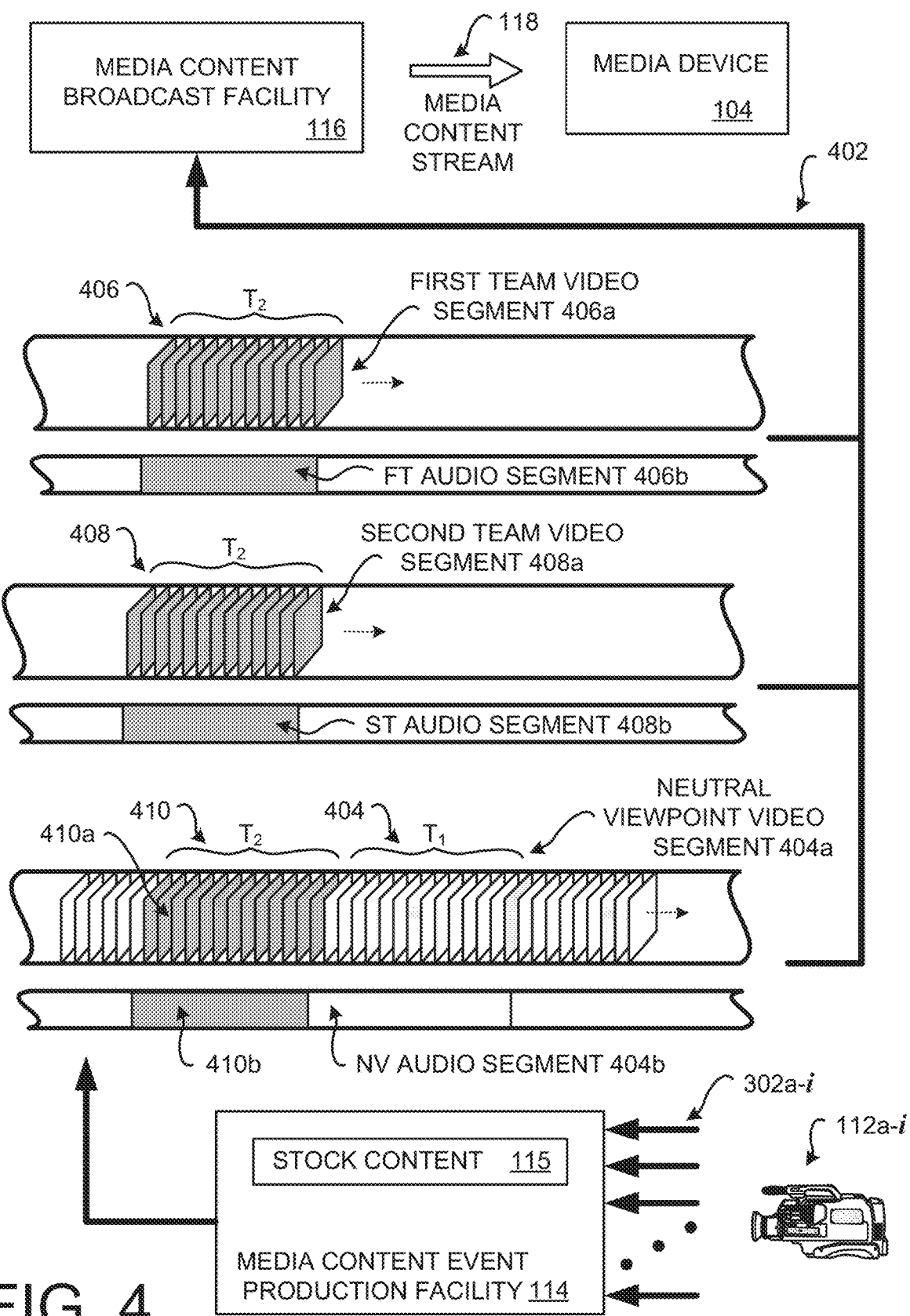
FIG. 4 is a conceptual diagram of the sporting event production that is generated from video and/or audio segments captured by the plurality of the image capture devices of FIG. 1.

FIG. 4 is a conceptual diagram of the sporting event production 402 that is generated from video and/or audio segments captured by the plurality of the image capture devices 112*a-i* of FIGS. 1-2.

To conceptually illustrate operation of the generation of the sporting event production 402 during game play, one skilled in the art appreciates that the operator at the media content event production facility 114 selects a neutral viewpoint segment 404 from the video content, and optionally the audio content, during the duration $T_1$ being captured by one of the image capture devices 112*a-i*. In the above-described conceptual example, video content during the duration $T_1$ captured by the image capture device 112*a* of the scoring goal made is by the player 206 is selected by the operator. Presumably, the first viewer who is a fan of the first team and the second viewer who is a fan of the second team will both want to see that particular game play. Accordingly, for the duration $T_1$ of the sporting event production, a single viewpoint video segment selected from a single video content stream and a single audio content stream are included in the sporting event production. This viewpoint segment of the sporting event production is referred to as the neutral viewpoint segment 404 since this segment does not favor any particular team. The neutral viewpoint segment 404 comprises a neutral viewpoint video segment 404*a*, and comprises a neutral viewpoint audio segment 404*b*.

After a conclusion of the neutral viewpoint segment 404 (at the end of the duration $T_1$), the operator at the media content event production facility 114 may understand that the fans 218 of the first team are likely to be interested in viewing the reaction of the fans 218 in the stadium (FIG. 2). Accordingly, during the following duration $T_2$, the operator may select the video and/or audio portion of the captured content stream 302*b* being captured by the second image capture device 212*b*. This alternative content segment is conceptually illustrated as the first team (FT) segment 406 (interchangeably referred to herein as alternative video content). To show a video of the cheering fans 218, the first team video segment 406*a* (corresponding to the video portion of the captured content stream 302*b*, and interchangeably referred to herein as alternative audio content) is selected for inclusion in the sporting event production 402.

Further, the operator may decide to include the corresponding audio portion of the captured content stream 302*b* in the first team segment 406 so that the viewer who is a fan of the first team can hear the cheering fans 218. Alternatively, or additionally, the operator may select the corresponding audio portion of the captured content stream 302*d* that is providing commentary from one or more of the commentators 216 who are describing some aspect of the play that is expected to be of interest to the viewer who is a fan of the first team. Alternatively, the neutral viewpoint audio segment 404*b* may be used to provide audio when the first team video segment 406*a* is being presented.

Here, the above-described selected video segment and optional selected audio segment are associated with a viewpoint that favors the first team. A suitable identifier or the like associated with the first team is then associated and included with the data of the first team segment 406.

However, the operator may appreciate that viewers who are fans of the second team are not likely to be interested in viewing the cheering fans 218. Accordingly, the operator may select a different video and/or audio segment that is likely to be of interest to viewers who are fans of the second team. To conceptually illustrate this aspect, assume that the above-described potential foul is being captured by the third image capture device 112*c* by the third cameraman (where the third player 212 of the first team is tripping the fourth player 214 of the second team, thereby likely causing a foul play that is likely to be penalized), as illustrated in FIG. 2. That is, the operator at the media content event production facility 114 may appreciate that the fans of the second team would like to see a video of this potential foul play Here, the third image capture device 112*c* is providing the captured content stream 302*c* (FIG. 3) to the media content event production facility 114.

Concurrently with selection of the second team viewpoint segment 408*a* as alternative content that favors the viewpoint of the second team, one of the commentators 216 may also be providing a narrative discussing the potential foul play. Accordingly, during the duration $T_2$, the operator may select the video content from the third image capture device 212*c* (here, conceptually illustrated as the second team (ST) video segment 408*a*, and interchangeably referred to herein as alternative video content) and audio content captured by the fourth image capture device 112*d* (here, conceptually illustrated as the ST audio segment 408*b*, and interchangeably referred to herein as alternative audio content) to comprise the alternative content that favors the second team viewpoint. A suitable identifier or the like associated with the second team is included with the second team segment 408.

Further, the operator of the media content event production facility 114 may also appreciate that other viewers may not be particularly interested in viewing either of the reaction of the fans 216 or the potential foul play. Rather, the operator may appreciate that these viewers may simply wish to view a replay of the game score and/or view alternative content stored in the stock content memory 115. Accordingly, the video content captured by the image capture device 112*a* during the duration $T_1$ may be repeated (instant replay), and/or alternative content may be presented, during the duration $T_2$. Accordingly, during the duration $T_2$, the operator may concurrently select the instant replay of the video content from the first image capture device 212*a* and/or alternative video content for inclusion as a neutral viewpoint video segment 410*a*. Also, the operator may select audio content from any suitable source, such as the optionally audio content from one of the commentators 216 or even audio content from the stock content memory 115, for inclusion in the sporting event production 402 as the audio segment 410*b*.

Summarizing the above-described conceptual example, during the duration $T_1$ of the sporting event production 402, a segment of the video content stream 304*a* captured by the first image capture device 112*a* of the scoring game play is selected, and in then added to the sporting event production 402 as a neutral viewpoint segment 404*a*. During the later following duration $T_2$, the sporting event production 402 comprises three video content stream viewpoint segments (and corresponding audio viewpoint segments). The first team video segment 406*a*, the second team video segment 408a, and the replay of the scoring goal (neutral viewpoint video segment 410a) are then included in the sporting event production 402.

One or more of the associated audio content segments may also be included and associated with an associated one of the viewpoint video segments. However, in some situations, a common audio segment may be used for two or more of the different video viewpoint segments that are communicated in the sporting event production 402.

In an example embodiment, the different video viewpoint segments and/or audio viewpoint segments are synchronized with each other in real time. That is, when multiple viewpoint segments are available in the sporting event production 402, each of the multiple different viewpoint segments start, and then end, at or approximately at the same time during the play of the sporting event 108. Time stamps, or other suitable identifiers, are included in the viewpoint segments to coordinate presentation times of the various content during the sporting event 108. The time stamps or other identifiers identify at least the beginning and end of each viewpoint segment.

FIG. 4 conceptually illustrates the different viewpoint segments as being separate and distinct streams of video and audio data. In practice, an example embodiment packetizes the viewpoint segments into discrete packets, wherein each packet is identified using a suitable packet identifier. The packet of video and audio data can then be interleaved together, or otherwise combined together, into a single stream of data that is communicated as the media content stream 118. The receiving media devices 104 are then able to reconstruct the stream of communicated media content (streams of video and audio content), and then present the media content. When different viewpoint content segments are available for presentation, the particular presented viewpoint segment is presented based on the determined level of viewer engagement.

Figure 5:
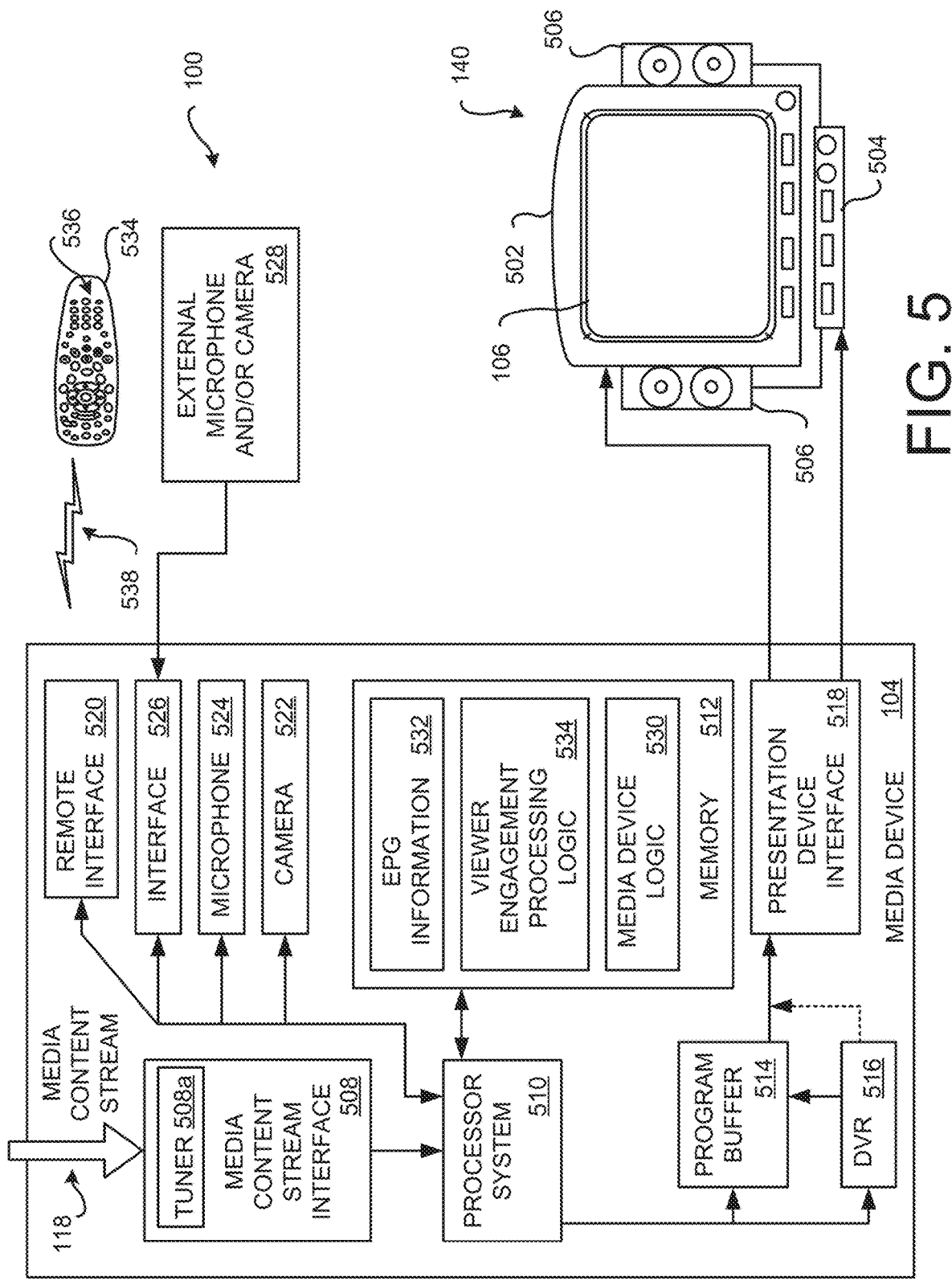
FIG. 5 is a block diagram of a sporting event presentation system that is operable to control a media device.

FIG. 5 is a block diagram of a sporting event presentation system 100 that is operable to control a media device 104, such as, but not limited to, a set top box (STB). Embodiments of the sporting event presentation system 100 are configured to sense one or more characteristics of a viewer, and then determine which of a plurality of available viewpoint segments of the sporting event production 402 should be presented based on the determined level of viewer engagement. Embodiments may be implemented in other media devices, such as, but not limited to, televisions (TVs), digital video disc (DVD) players, digital video recorders (DVRs), cellular phones equipped with video functionality, personal device assistants (PDAs), or personal computers (PCs) that are configured to present a video-based sporting event that is received in a media content stream 118.

The exemplary media device 104 is communicatively coupled to components of a media presentation system 140 that includes a visual display device 502, such as a television (hereafter, generically a TV), and an audio presentation device 504, such as a surround sound receiver controlling an audio reproduction device (hereafter, generically, a speaker 506). Other types of output devices may also be coupled to the media device 104, including those providing any sort of stimuli sensible by a human being, such as temperature, vibration and the like. The video portion of the media content event is displayed on the display 106 and the audio portion of the media content event is reproduced as sounds by one or more speakers 506. In some embodiments, the media device 104 and one or more of the components of the media presentation system 140 may be integrated into a single electronic device.

The non-limiting exemplary media device 104 comprises a media content stream interface 508, a processor system 510, a memory 512, a program buffer 514, an optional digital video recorder (DVR) 516, a presentation device interface 518, a remote interface 520, an optional camera 522, an optional microphone 524, and an optional interface 526 configured to connect to an external microphone and/or camera 528. The memory 512 comprises portions for storing the media device logic 530, the electronic program guide (EPG) information 532, and the viewer engagement processing logic 534. In some embodiments, the media device logic 530 and the viewer engagement processing logic 534 may be integrated together, and/or may be integrated with other logic. In other embodiments, some or all of these memory and other data manipulation functions may be provided by and using remote server or other electronic devices suitably connected via the Internet or otherwise to a client device. Other media devices 104 may include some, or may omit some, of the above-described media processing components. Further, additional components not described herein may be included in alternative embodiments.

As noted above, a viewer or multiple viewers (not shown) may be viewing a sporting event production 402 that presents the sporting event 108 (FIGS. 1-4). With embodiments of the sporting event presentation system 100, the media device 104 can then control itself and the components of the media presentation system 140 in accordance a determined level of viewer engagement that corresponds to a determinable preference for one of the team playing the sporting event 108. Determining viewer engagement levels, determining a team preference of a viewer, and controlling media content presentation of the sporting event 108 that has been received in the sporting event production 402 is managed by the processor system 510 executing the viewer engagement processing logic 534.

The functionality of the media device 104, here a set top box, is now broadly described. A media content provider provides media content that is received in one or more multiple media content streams 118 multiplexed together in one or more transport channels. The transport channels with the media content streams 118 are communicated to the media device 104 from a media system sourced from media content broadcast facility 116 (FIG. 1) operated by the media content provider. Non-limiting examples of such media systems include satellite systems, cable system, and the Internet. For example, if the media content provider provides programming via a satellite-based communication system, the media device 104 is configured to receive one or more broadcasted satellite signals detected by the receiver antenna 132 (FIG. 1). Alternatively, or additionally, the media content stream 118 can be received from one or more different sources, such as, but not limited to, a cable system, a radio frequency (RF) communication system, or the Internet.

The one or more media content streams 118 are received by the media content stream interface 508. One or more tuners 508a in the media content stream interface 508 selectively tune to one of the media content streams 118 in accordance with instructions received from the processor system 510. The processor system 510, executing the media device logic 530 and based upon a request for a media content event of interest, here the sporting event 108 specified by the viewer(s), parses out media content associated with the sporting event 108 as determined by the viewer engagement processing logic 534. The sporting event production 402 that presents the sporting event 108 is then assembled into a stream of video and/or audio information which may be stored by the program buffer 514 such that the media content can be streamed out to components of the media presentation system 140, such as the visual display device 502 and/or the audio presentation device 504, via the presentation device interface 518.

Alternatively, or additionally, the parsed out media content of the sporting event production 402 may be saved into the DVR 516 for later presentation. The DVR 516 may be directly provided in, locally connected to, or remotely connected to, the media device 104. In alternative embodiments, the media content streams 118 may stored for later decompression, processing and/or decryption. When the stored sporting event production 402 is retrieved for later presentation by the viewer, the media content may be optionally controlled by the viewer engagement processing logic 534 to present alternative content in accordance with determined viewer engagement levels and viewer team preferences.

From time to time, information populating the EPG 532 portion of the memory 512 is communicated to the media device 104, via the media content stream 118 or via another suitable media. The EPG 532 portion of the memory 512 stores the information pertaining to the scheduled programming. The information may include, but is not limited to, a scheduled presentation start and/or end time, a program channel, and descriptive information pertaining to the example sporting event 108. The program's descriptive information may include the title of the program, names of performers or actors, date of creation, and a summary describing the nature of the program. Any suitable information may be included in the program's supplemental information.

Upon receipt of a command from the user requesting presentation of an EPG display, the information in the EPG 532 is retrieved, formatted, and then presented on the display 106 as an EPG. In an example embodiment, the sporting event 108 is identified in the presented EPG. If currently broadcasting, the viewer may select the sporting event 108 via the EPG. If scheduled for a future broadcast, the viewer may select the sporting event 108 for recording into the DVR 516 and/or for later presentation when the sporting event 108 is eventually broadcast. In an example embodiment, the viewer may optionally select the presentation of the sporting event 108 in a first mode (a neutral viewpoint only mode of presentation) wherein presentation is limited to the neutral viewpoint. That is, the viewer is not presented alternative content base on a determination of their engagement level and/or their team preference. Alternatively, the viewer may elect a second mode of operation (an alternative viewpoint mode of presentation) to have the presentation of the sporting event 108 controlled by the viewer engagement processing logic 534 in accordance with their determined engagement level and/or their determined team preference. Any suitable selectable hot spot, icon, or the like may be included on the presented EPG in proximity to the listing of the sporting event 108 such that the viewer can select between the two modes of presentation.

The exemplary media device 104 is configured to receive commands from a viewer via a remote control 534. The remote control 534 includes one or more controllers 536. The user, by actuating one or more of the controllers 536, causes the remote control 534 to generate and transmit commands, via a wireless signal 538, to the media device 104. In an example embodiment, one of the controllers 536 is dedicated (predefined) and is configured to permit the viewer to select between the above-described neutral viewpoint mode or the alternative content mode of presentation by actuating the predefined controller 536. This particular controller 536 may be identified by a unique color and/or location on the surface of the remote control 534 that the user learns is associated with controlling the above-described modes of operation. Thus, the viewer can easily change between presentation modes by actuating that particular predefined controller 536. The commands control the media device 104 and/or control components of the media presentation system 140. The wireless signal 538 may be an infrared (IR) signal or a radio frequency (RF) signal that is detectable by the remote interface 520.

The processes performed by the media device 104 relating to the processing of the received media content stream 118 and communication of a presentable media content event to the components of the media presentation system 140 are generally implemented by the processor system 510 while executing the media device logic 530. Thus, the media device 104 may perform a variety of functions related to the processing and presentation of one or more media content events received in the media content stream 118.

When a user of one of the media devices 104 is viewing a presentation of the sporting event 108 of the sporting event production 402 (received in the media content stream 118) using the alternative content mode of presentation, embodiments of the sporting event presentation system 100 begin by presenting the initially received neutral viewpoint video and the neutral viewpoint audio segment segments (portions) of the received sporting event production 402. That is, the presentation of the sporting event production 402 initially appears the same as, or similar to, the neutral viewpoint mode of presentation which may approximate, or even be the same as, a conventional presentation of the sporting event 108.

In the initially presented neutral viewpoint video and audio segment portions, if one or more of alternative segments are also initially in the received sporting event production 402, these alternative segments are not presented to the viewer since the viewer's team preference has not yet been determined (based on the determined level of viewer engagement to presentation of the sporting event 108).

Typically, some amount of time of monitoring behavior of the viewer is required for the sporting event presentation system 100 to determine the level of viewer engagement to the presented sporting event production 402. Viewer behavior is monitored by analyzing data captured by the camera 522, the microphone 524, and/or the external microphone and/or camera 528. One skilled in the arts appreciates that monitoring viewer engagement based on analysis of captured video of the viewer(s) and/or captured audio information made by the viewer(s) can be analyzed to determine a level of viewer engagement. For example, U.S. application Ser. No. 13/691,557 to Ramaswamy et. al., which is incorporated herein by reference in its entirety, discloses one or more processes that may be used by various embodiments of the sporting event presentation system 100 to determine a value of a viewer's engagement level.

In practice, the camera 522 and the external microphone and/or camera 528 are oriented towards the seating area or viewing area if a media presentation room wherein the view(s) is likely to be viewing the sporting event 108. A facial expression, a posture, and/or a hand or arm gesture of the viewer in a video image detected by the camera 522 and the external microphone and/or camera 528 may be correlated with the level, amount, or degree of viewer engagement. Here, the identified facial expression, posture and/or gesture is compared with a first plurality of facial expressions, postures and/or gestures stored in the memory 512 (or another suitable memory medium) that indicate favoritism and a second plurality of stored facial expressions, postures and/or gestures that indicate disfavor.

Embodiments determine that the viewer has the preference for the first team when the identified at least one facial expression, posture and/or gesture corresponds to one of the first plurality of stored facial expressions, postures and/or gestures. For example, but not limited to, a facial expression of a smile of the viewer may be compared with smile expressions stored in the memory 512 (or another suitable memory medium) to determine that the viewer is a fan of the identified team in the presented video segment. A clapping hand gesture or raised arms may be associated with favoritism with a particular team. Leaning forward may be a posture associated with team favoritism.

Conversely, embodiments determining that the viewer has the preference for the second team when the identified at least one facial expression, posture and/or gesture corresponds to one of the second plurality of stored facial expressions, postures and/or gestures. For example, but not limited to, a facial expression of a frown of the viewer may be compared with stored frown expressions to determine that the viewer is a not fan of the identified team in the presented video segment. A hand gesture of a first or a punching motion may be associated with disfavor of a particular team. Leaning backward may be a posture associated with team disfavor.

The microphone 514 and/or the external microphone and/or camera 528 are located so as to be able to detect sounds made by the viewer(s). Example detectable sounds include, but are not limited to, cheering, booing, and/or other commentary. The detected sound, interchangeably referred to herein as an audio clip, may be analyzed for content characteristics, such as wherein cheering or booing are identified. The audio content characteristics from the audio clip may be compared with a first plurality of audio characteristics stored in the memory 512 (or another suitable memory medium) that correspond to favoritism and a stored second plurality of audio characteristics that corresponds to disfavor.

Alternatively, or additionally, a volume level of the sounds may be analyzed, wherein the volume level may be correlated with a degree of viewer engagement by comparing the determined volume level with a volume level threshold stored in the memory 512 (or another suitable memory medium). When the identified volume level is at least equal to the volume level threshold, a preference for the team identified in that corresponding video segment may be determined for the viewing user. Optionally, when the identified volume level is less than the stored volume level threshold, a preference for the other team, or team neutrality, may be determined.

Particular spoken key words may be identified in the detected sounds. A key word is a word or phrase that has a determinable meaning about the object of a spoken sentence, wherein the meaning of the key word can be associated with liking (favoritism) or disliking (disfavor) of the object. At least one key word from the audio clip may be compared with a plurality of first key words stored in the memory 512 (or another suitable memory medium) that correspond to favoritism and a second plurality of key words that corresponds to disfavor. Embodiments then determine that the viewer has the preference for the associated team when the identified at least one key word corresponds to one of the stored first plurality of key words, or determines that the viewer has the preference for the other team when the identified at least one audio key word corresponds to one of the stored second plurality of key words.

For example, for a particular presented segment of the sporting event production 402, one or more of the viewers may be highly engaged, mildly engaged, somewhat engaged or not engaged. One skilled in the art appreciates that a degree (value) of viewer engagement level can be quantified in any suitable manner, such as on a sliding scale of numerals, by a rating level (such as, high to low), or the like. For a conceptual description of a non-limiting example embodiment of the sporting event presentation system 100, the degree of viewer engagement level will be classified into one of three categories: a high level of engagement, a neutral level of engagement, or a low level of engagement.

Many types of sporting events 108 involve a competition between two opposing teams. As appreciated by one skilled in the art, the level of activity exhibited by the monitored viewer and/or the volume/amount/type of sound emitted by the monitored viewer may be correlated to a degree of the viewer engagement level. However, determining the degree of viewer engagement level is not sufficient alone to ascertain which particular team the viewer is a fan of (or if the viewer is neutral).

Accordingly, embodiments of the sporting event presentation system 100 further determine which team the viewer is a fan of (interchangeably referred to herein as a team preference). In some instances, the viewer may not be a fan of either team. Accordingly, the segments of the sporting event production 402 include the additional information that is associated with team identification. Such team identification information is a presented segment of the sporting event production 402 is not included in a legacy productions of the sporting event 108. The team identification information is used to further determine which team the viewer is a fan of.

In an example embodiment, when a first team performs a particularly advantageous play (such as a game score), a suitable identifier associated with the first team is included in that corresponding segment of the sporting event production 402. That is, the team identifier is added into that segment (as data) such that the viewer engagement processing logic 534 can correlate the determined level of viewer engagement with the team identifier. For example, returning to the conceptual sporting event 108 described herein, the segment 310, 404 corresponding to the duration T1 (FIGS. 3-4) showing the game score by the first team has an identifier or the like in that segment that indicates that the first team has performed particularly well during that segment of the sporting event production 402.

The attributes of the monitored viewer then are analyzed in the context of their determined degree of viewer engagement level. For example, the game score may elicit a relatively high level of viewer engagement for viewers who are a fan of the first team and for viewers that are a fan of the second team. However, their exhibited characteristics of their high level of viewer engagement are likely to be quite different depending upon their actual team preference. Here, fans of the first team may be relatively happy or pleased by the game score. Such viewers may loudly cheer, clap, applaud, and/or exhibit gestures that may be attributed to a degree of favoritism for the first team's performance during that segment. These sounds and/or gestures may be recognized by the viewer engagement processing logic 534 as corresponding to a degree of favoritism on the part of the viewer. Accordingly, a preference for the first team may be then determined.

In contrast, fans of the second team may be relatively disappointed, displeased, or even angry. Viewers who are fans of the second team may loudly boo, scream in anger, or make negative gestures that may be attributed to a degree of disfavor for the performance during that segment in response to viewing the segment where the first team scored a game point. These sounds and/or gestures may be recognized by the viewer engagement processing logic 534 as exhibiting a degree of disfavor for the first team on the part of the viewer. Accordingly, a preference for the second team may be then determined.

Additionally, or alternatively, dialogue spoken by the viewer(s) may be analyzed for key words which tend to indicate a degree of favoritism. A stored list of words associated with favoritism, such as fantastic, great, wonderful, amazing, or the like can be compared with determined dialogue words from the detected sounds to determine if the viewer favors the first team. In contrast, a stored list of words associated with favoritism, such as horrible, unfair, rotten, or the like can be compared with determined dialogue words to determine if the viewer disfavors the first team (and is therefore, presumably, a fan of the second team).

Accordingly, embodiments of the viewer engagement processing logic 534 are configured associate the detected characteristics exhibited by the viewer as being in favor of, or in disfavor of, the team identified in the segment (that was known to have performed particularly well in that segment). The viewer can be determined to favor the identified team performing particularly well in that segment when the level of viewer engagement exceeds a threshold and when attributes relating to their response tends to indicate favoritism for the first team. Accordingly, a preference for the first team may be then determined.

Alternatively, the viewer can be determined to disfavor the identified team performing particularly well in that segment when the level of viewer engagement exceeds a threshold and when attributes relating to their response tends to indicate disfavor for the first team. Accordingly, a preference for the second team may be then determined.

Further, the degree of the viewer's engagement level determined from the monitoring of the presented segment may indicate neither favoritism or disfavor on the part of the viewer for the team that performed particularly well in that presented segment. Even though the viewer may exhibit some relatively small degree of favoritism or disfavor, embodiments of the viewer engagement processing logic 534 may determine that the viewer's viewpoint is substantially neutral when the degree of their determined viewer engagement level is less that the threshold that was used to determine a high degree of favor or disfavor. Alternatively, a different lower threshold may be used to determine viewer neutrality.

After a sufficient duration of presentation of the sporting event production 402 to the viewer, embodiments of the viewer engagement processing logic 534 are able to reliably and accurately determine whether the viewer is a fan of one of the teams playing in the sporting event 108, or if the viewer is neutral with respect to the playing teams. For example, if a predefined number of segments indicate that an identified one of the two teams has performed particularly well in that segment, and if the viewer consistently responds as liking or disliking the performance of the teams in that segment, then the viewer's preferred team can be identified. For example, if the first team scores a point and the viewer loudly cheers and claps, and then the first team commits a foul and the viewer loudly boos, then the high of the degree of the viewer's engagement level coupled with the viewer's response to the two segments would enable the sporting event presentation system 100 to accurately and reliably determine that the viewer is a fan of the first team. Conversely, when the first team scores the point and the viewer loudly boos, and then the first team commits the foul and the viewer loudly cheers and claps, then the high of the degree of the viewer's engagement level coupled with the viewer's response to the two segments would enable the viewer engagement processing logic 534 to accurately and reliably determine that the viewer is a fan of the second team. If the degree of the viewer's engagement level does not exceed the threshold, then the viewer engagement processing logic 534 accurately and reliably determines that the viewer is neutral towards the first team and the second team. Accordingly, alternative content for the favored team may be presented to the viewer based on their determined team preference.

Some sporting events 108 involve competition among more than two opposing teams. For example, a track and field event may involve a number of competitions, such as a race or the like, that have participants who are members of a number of different teams that may be representing countries, schools or the like. Here, the segment may include an identifier that has been associated with the winner of a particular competition or another competitor who has performed particularly well in that competition. The response of the viewer can be analyzed to determine which of the particular teams the viewer is a fan of by determining which particular ones of the competitors that the viewer is enthusiastic about. The viewer may even be a fan of multiple teams. Accordingly, alternative content for the one or more preferred teams may be presented to the viewer based on their determined team preferences.

In some embodiments, the identifier associated with the team that performed particularly well in that segment may be omitted. Rather than using an identifier in that particular segment, information in following alternative content segments may be used to determine the viewer's team preference. For example, the first team video segment 406a showing the replay of the game score by the first team may be used to identify or determine that the first team performed particularly well in the preceding segment. Thus, the alternative content itself may be used to correlate viewer behavior to determine the viewer's team preference. However, such an embodiment is not preferred since it may be more computationally intensive, and may take a longer time, to accurately and reliably determine the viewer's team preference.

Figure 6:
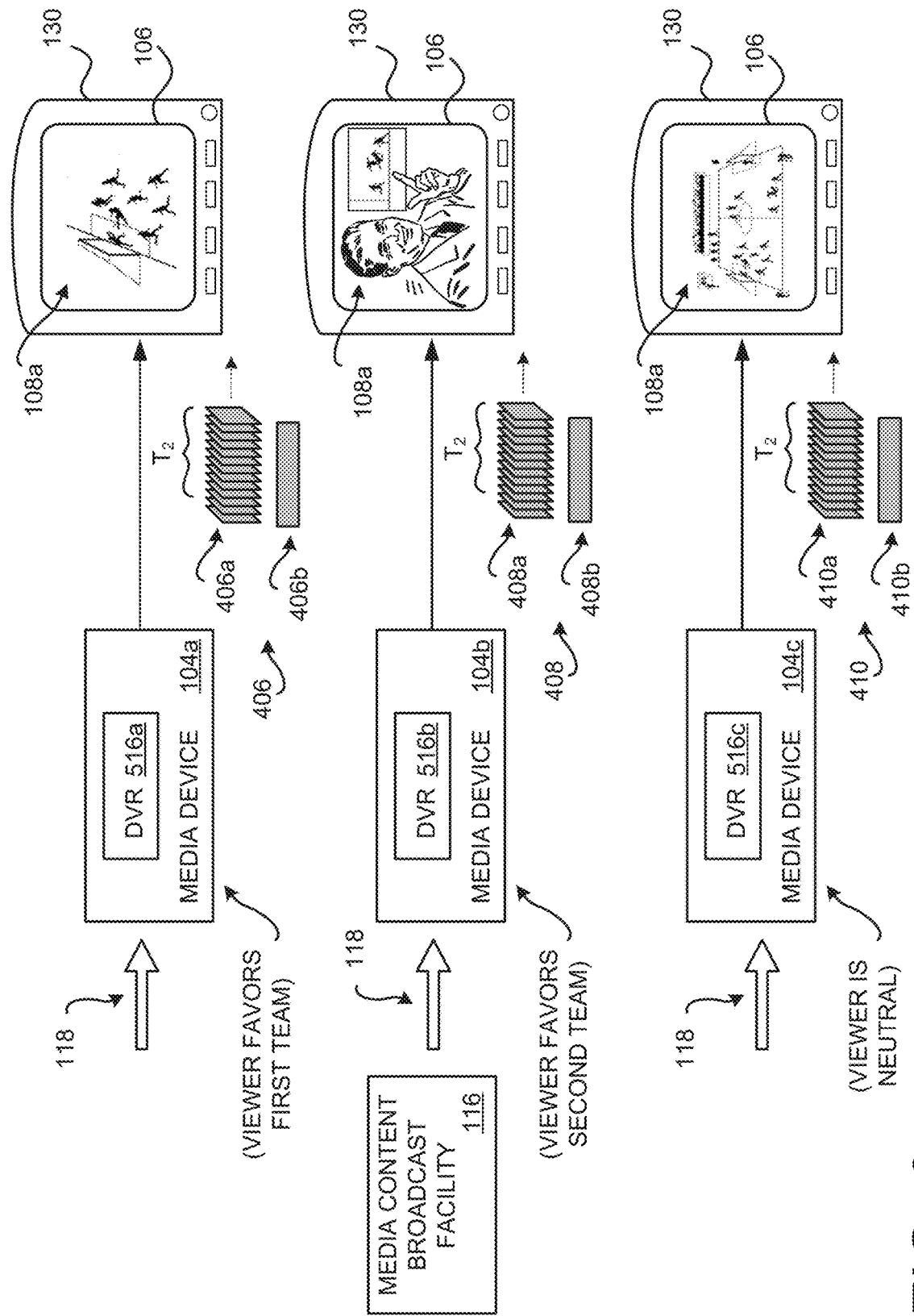
FIG. 6 is a conceptual diagram of the sporting event production that is presented by the media devices.

FIG. 6 is a conceptual diagram of the sporting event production that is presented by the media devices. Here, the media content broadcast facility 116 communicates the sporting event production 402 to the media devices 104a-c. The sporting event production 402 is received in the media content stream 118, is processed based on a determination of the viewer's team preference, and is then presented on the respective display 106. Alternatively, the entirety of the sporting event production 402 may have been saved in the respective one of the DVRs 516a-c, or saved into another suitable storage medium, for later presentation to the viewer.

Operation of the sporting event presentation system 100 to control presented segments is conceptually described in the context of the above-described hypothetical sporting event 108. Here, the viewer using the first media device 104a is presumed to be a fan of the first team. The viewer using the second media device 104b is presumed to be a fan of the second team. The viewer using the third media device 104c is presumed to have a neutral viewpoint with respect to the first team or the second team.

The media content broadcast facility 116 communicates the same sporting event production 402 to the media devices 104a-c in the media content stream 118. The sporting event production 402, for various durations (periods of game play) may include neutral viewpoint segments, first team alternative segments, and/or second team alternative segments. When no alternative content is provided in a currently presenting segment of the sporting event production 402, each of the viewers are presented the same neutral viewpoint content. For example, during presentation of the above-described segment associated with the duration $T_1$, the neutral viewpoint segment 404 that comprises a neutral viewpoint video segment 404a and a neutral viewpoint audio segment 404b is presented to all viewers.

However, from time to time during the sporting event production 402, alternative content will be available to the different viewers based on their determined team preference. For example, during the presentation of the above-described segment associated with the duration $T_2$, the first team alternative content video segment 406 (showing video of the replay in the alternative video content 408a of the scoring play) and optionally the corresponding audio portion of the cheering fans 218 in the alternative audio content 406b, is selected by the media device 104a for presentation to that respective viewer (who was previously determined to be a fan of the first team).

In contrast, during the presentation of the above-described segment associated with the duration $T_2$, the second team video segment 408 (showing a video replay of the foul and a narrative discussing the potential foul play from the commentator 216 in the alternative video content 408a and the alternative audio content 408b) is selected by the media device 104b for presentation to the that respective viewer (who was previously determined to be a fan of the second team).

Further, during the presentation of the above-described segment associated with the duration $T_2$, the neutral viewpoint video segment 410 (showing a continued play in the neutral viewpoint video content 410a and the neutral viewpoint audio content 410b) is selected by the media device 104b for presentation to the that respective viewer (who was previously determined to be neutral) That is, the viewer using the media device 104c is neither a fan of the first team or the second team.

In an alternative embodiment, presentation of the neutral viewpoint video segment 410a, corresponding to presentation of the live broadcast version of the sporting event 108, may be paused. Here, the following neutral viewpoint video segment portion is temporarily stored in the program buffer 514 while the alternative content is being presented to the viewer. After the alternative content has been presented, presentation of the buffered neutral viewpoint video segment may resume (from the point that it was first buffered).

The media device 104 tracks the duration of each presented alternative content segment to define a total cumulative duration. If the total cumulative duration of the alternative content portion, or multiple presented alternative content portions, is below some threshold duration, then the process of pausing, buffering, presenting alternative content, and then resuming presentation of the buffered neutral viewpoint video content may continue until the end of the sporting event production 402. Here, the viewer will simply see the presented end of the sporting event 108 after the real time ending of the sporting event 108.

However, if the total cumulative duration of the alternative content portion exceeds the threshold, then selected portions of the neutral viewpoint video segment portion may be skipped, jumped over, and/or fast forwarded through. Alternatively, or additionally, commercials or the like, segments that are not likely of great interest to any viewer, and/or other segments that may not be particularly relevant to the sporting event 108, may be skipped, jumped over, and/or fast forwarded through. Accordingly, the total presentation time required for presentation of the sporting event production 402 can be managed and/or limited to a maximum time limit.

In an example embodiment, the producers of the sporting event production 402 may identify one or more segments of the neutral viewpoint video as being a "sacrificial" segment. For example, there may be periods of relative inactivity during the game play that would not be of particular interest to any of the viewers. Here, the sacrificial segment may be skipped, jumped over, and/or fast forwarded through if the total cumulative duration of the alternative content portion, as determined at the media device 104, exceeds the threshold. When a sacrificial segment is skipped, jumped over, and/or fast forwarded through, then the total cumulative duration of the alternative content portion is reset to a lower value (corresponding to the duration of the sacrificed segment). In this manner, the total cumulative duration of the alternative content portions can be limited to some predefined duration or time limit.

It should be emphasized that the above-described embodiments of the sporting event presentation system 100 are merely possible examples of implementations of the invention. Many variations and modifications may be made to the above-described embodiments. All such modifications and variations are intended to be included herein within the scope of this disclosure and protected by the following claims.

The invention claimed is:

1. A media content presentation method for presenting a sporting event on a display, the method comprising:
receiving, at a media device, a sporting event production presenting game play between a first team and a second team, the sporting event production comprising:
a series of neutral viewpoint video content segments that are serially presentable on the display to a viewer during the presentation of the sporting event, and wherein each of the neutral viewpoint video content segments are associated with a duration corresponding to a period of game play of the sporting event;
a first team alternative video content segment corresponding to a first period of game play that occurs within the period of game play of the series of neutral viewpoint video content segments, wherein the first team alternative video content segment includes a first identifier associated with the first team that is playing in the sporting event; and
a second team alternative video content segment corresponding to the first period of game play, wherein the second team alternative video content segment includes a second identifier associated with the second team that is playing in the sporting event;
presenting a first neutral viewpoint video content segment on the display to a user of the media device, wherein the first neutral viewpoint video content segment includes one of the first identifier associated with the first team or the second identifier associated with the second team, wherein a team preference of the user has not yet been determined by the media device, and wherein the first neutral viewpoint video content segment is presented prior to the first period of game play;
detecting a response of the user during presentation of the first neutral viewpoint video content segment, wherein the response of the user is acquired by at least one of a microphone that acquires sounds made by the user and a camera that acquires image of the user;

determining, at the media device, a degree of viewer engagement of the user and a characteristic of the user response based on the detected user response;

comparing the determined characteristic of the user response with a plurality of first characteristics associated with a preference of favoritism, a plurality of second characteristics associated with a preference of disfavor, and a plurality of third characteristics associated with a neutral preference;

associating the determined characteristic of the user response with the preference of favoritism when the determined characteristic of the user response matches with one of the plurality of first characteristics;

associating the determined characteristic of the user response with the preference of disfavor when the determined characteristic of the user response matches with one of the plurality of second characteristics;

associating the determined characteristic of the user response with the neutral preference when the determined characteristic of the user response matches with one of the plurality of third characteristics;

determining one of a user's first team preference that indicates that the user favors the first team, a user's second team preference that indicates that the user favors the second team, and user's neutral team preference that indicates that the user favors neither the first team or the second team, wherein the user's first team preference is determined when the degree of viewer engagement exceeds a threshold and when the characteristic of the user response is associated with the preference of favoritism for the first team or the preference of disfavor for the second team, wherein the user's second team preference is determined when the degree of viewer engagement exceeds the threshold and when the characteristic of the user response is associated with the preference of favoritism for the second team or the preference of disfavor for the first team, and wherein the user's neutral team preference is determined when the degree of viewer engagement does not exceed the threshold;

presenting a following one of the series of neutral viewpoint video content segments on the display during the first period of game play when the user's neutral team preference is determined;

alternatively presenting the first team alternative video content segment on the display during the first period of game play when the user's first team preference is determined, wherein the following one of the series of neutral viewpoint video content segments is not presented on the display while the first team alternative video content segment is being presented; and alternatively presenting the second team alternative video content segment on the display during the first period of game play when the user's second team preference is determined, wherein the following one of the series of neutral viewpoint video content segments is not presented on the display while the second team alternative video content segment is being presented.

2. The method of claim 1, wherein after presentation of one of the neutral viewpoint video content segment, the first team alternative video content segment, or the second team alternative video content segment to the viewer during the first period of game play, the method further comprising:

receiving a next neutral viewpoint video content segment that follows the neutral viewpoint video content segment during a next period of game play that follows the first period of game play; and presenting only the next neutral viewpoint video content segment when there is no associated next first team alternative video content segment or next second neutral viewpoint video content segment in the received sporting event production.

3. The method of claim 1, wherein determining whether the viewer prefers the first team or the second team based on the determined degree of viewer engagement comprises:

capturing a video image of the viewer using the camera when the first neutral viewpoint video content segment is presented;

identifying at least one facial expression, posture or gesture made by the viewer in the captured video image;

comparing the identified at least one facial expression, posture or gesture with a stored first plurality of facial expressions, postures or gestures that indicate favoritism and a stored second plurality of facial expressions, postures or gestures that indicate disfavor;

determining that the viewer has the preference for the first team when the identified at least one facial expression, posture or gesture corresponds to one of the stored first plurality of facial expressions, postures or gestures; and determining that the viewer has the preference for the second team when the identified at least one facial expression, posture or gesture corresponds to one of the stored second plurality of facial expressions, postures or gestures.

4. The method of claim 1, wherein determining whether the viewer prefers the first team or the second team based on the determined degree of viewer engagement comprises:

capturing an audio clip of sounds made by the viewer using the microphone when the first neutral viewpoint video content segment is presented;

identifying at least one audio content characteristic from the audio clip;

comparing the identified at least one audio content characteristic with a stored first plurality of audio content characteristics that indicate favoritism and a stored second plurality of audio content characteristics that indicate disfavor;

determining that the viewer has the preference for the first team when the identified at least one audio content characteristic corresponds to one of the stored first plurality of audio content characteristics; and determining that the viewer has the preference for the second team when the identified at least one audio content characteristic corresponds to one of the stored second plurality of audio content characteristics.

5. The method of claim 1, wherein determining whether the viewer prefers the first team or the second team based on the determined degree of viewer engagement comprises:

capturing an audio clip of sounds made by the viewer using the microphone when the first neutral viewpoint video content segment is presented;

identifying a volume level from the audio clip;

comparing the identified volume level with a stored volume level threshold; and determining that the viewer has the preference for the first team when the identified volume level is at least equal to the volume level threshold.

6. The method of claim 1, wherein determining whether the viewer prefers the first team or the second team based on the determined degree of viewer engagement comprises:
   capturing an audio clip of sounds made by the viewer using the microphone when the first neutral viewpoint video content segment is presented;
   identifying at least one key word from the audio clip;
   comparing the identified at least one key word with a stored first plurality of key words that indicate favoritism and a stored second plurality of key words that indicate disfavor;
   determining that the viewer has the preference for the first team when the identified at least one key word corresponds to one of the stored first plurality of key words; and
   determining that the viewer has the preference for the second team when the identified at least one key word corresponds to one of the stored second plurality of key words.

7. The method of claim 1, wherein prior to presenting one of the neutral viewpoint video content segment, the first team alternative video content segment or the second team alternative video content segment, the method further comprising:
   presenting an electronic program guide (EPG) on the display to the user, wherein the EPG lists the sporting event and a plurality of other programs;
   receiving a first selection from the viewer via the presented EPG, wherein the first selection is of the sporting event; and
   receiving a second selection from the viewer via the presented EPG, wherein the second selection is one of a neutral viewpoint only mode of presentation of the sporting event or an alternative viewpoint mode of presentation,
   wherein one of the neutral viewpoint video content segment, the first team alternative video content segment or the second team alternative video content segment are presented only when the second selection is for the alternative viewpoint presentation, and
   wherein only the neutral viewpoint video content segment is presented when the second selection is for the neutral viewpoint only mode of presentation.

8. The method of claim 1, wherein prior to presenting one of the neutral viewpoint video content segment, the first team alternative video content segment or the second team alternative video content segment, the method further comprising:
   receiving a wireless signal from a remote control, wherein the wireless signal is generated in response to the viewer actuating a predefined one of a plurality of controllers of the remote control,
   wherein one of the neutral viewpoint video content segment, the first team alternative video content segment or the second team alternative video content segment are presented only in response to receiving the wireless signal from the remote control.

9. The method of claim 1, wherein the following one of the series of neutral viewpoint video content segments, the first team alternative video content segment, and the second team alternative video content segment occur during the same portion of the first period of game play.

10. The method of claim 1, wherein the sporting event production is a live broadcast of the sporting event, and further comprising:
    storing, at the media device, the following one of the series of neutral viewpoint video content segments while the first team alternative video content segment or the second team alternative video content segment is being presented on the display; and
    presenting the following one of the series of neutral viewpoint video content segments after presentation of the first team alternative video content segment or the second team alternative video content segment the has concluded.

11. The method of claim 10, further comprising:
    determining a total cumulative duration of a presentation time of the presented first team alternative video content segment or the presented second team alternative video content segment and presentation times of any subsequently presented first team alternative video content segments or subsequently presented second team alternative video content segments;
    skipping presentation of a subsequent portion of the broadcasting sporting event production when the total cumulative duration exceeds a threshold, wherein a duration of the skipped subsequent portion of the sporting event production is substantially the same as the total cumulative duration; and
    resuming presentation of the live broadcast of the sporting event production after skipping presentation of the subsequent portion of the sporting event production.

12. The method of claim 11, wherein the skipped presentation of the subsequent portion of the broadcasting sporting event production corresponds to a commercial that has been incorporated into the sporting event production.

13. The method of claim 11, wherein the received sporting event production comprises a sacrificial segment, wherein the sacrificial segment is the skipped presentation of the subsequent portion of the broadcasting sporting event production.

14. A media device that presents a sporting event on a display, comprising:
    a media content stream interface that receives a sporting event production comprising:
       a series of neutral viewpoint video content segments that are serially presentable on the display to a viewer during the presentation of the sporting event, and wherein each of the neutral viewpoint video content segments are associated with a duration corresponding to a period of game play of the sporting event;
       a first team alternative video content segment corresponding to a first period of game play that occurs within the period of game play of the series of neutral viewpoint video content segments, wherein the first team alternative video content segment includes a first identifier associated with a first team that is playing in the sporting event; and
       a second team alternative video content segment corresponding to the first period of game play, wherein the second team alternative video content segment includes a second identifier associated with a second team that is playing in the sporting event; and
    a processor system that, while the sporting event production is being received at the media content stream interface:
       presents a first neutral viewpoint video content segment on the display to a user of the media device, wherein the first neutral viewpoint video content segment includes one of the first identifier associated with the first team or the second identifier associated with the second team, wherein a team preference of the user has not yet been determined by the media device;

processes information corresponding to a detected response of the user during presentation of the first neutral viewpoint video content segment, wherein the response of the user is detected by at least one of a microphone that acquires sounds made by the user and a camera that acquires image of the user;

determines a degree of viewer engagement of the user and a characteristic of the user response based on the detected user response;

compares the determined characteristic of the user response with a plurality of first characteristics associated with a preference of favoritism, a plurality of second characteristics associated with a preference of disfavor, and a plurality of third characteristics associated with a neutral preference;

associates the determined characteristic of the user response with the preference of favoritism when the determined characteristic of the user response matches with one of the plurality of first characteristics;

associates the determined characteristic of the user response with the preference of disfavor when the determined characteristic of the user response matches with one of the plurality of second characteristics;

associates the determined characteristic of the user response with the neutral preference when the determined characteristic of the user response matches with one of the plurality of third characteristics;

determines one of a user's first team preference that indicates that the user favors the first team, a user's second team preference that indicates that the user favors the second team, and user's neutral team preference that indicates that the user favors neither the first team or the second team, wherein the user's first team preference is determined when the degree of viewer engagement exceeds a threshold and when the characteristic of the user response is associated with the preference of favoritism for the first team or the preference of disfavor for the second team, wherein the user's second team preference is determined when the degree of viewer engagement exceeds the threshold and when the characteristic of the user response is associated with the preference of favoritism for the second team or the preference of disfavor for the first team, and wherein the user's neutral team preference is determined when the degree of viewer engagement does not exceed the threshold;

presents a following one of the series of neutral viewpoint video content segments on the display during the first period of game play when the neutral team preference is determined;

alternatively presents the first team alternative video content segment on the display during the first period of game play when the first team preference is determined; and alternatively presents the second team alternative video content segment on the display during the first period of game play when the second team preference is determined.

15. The media device of claim 14, further comprising:

the camera that captures capture a video image of the viewer when the first neutral viewpoint video content segment is presented, wherein the processor system:

identifies at least one facial expression, posture or gesture made by the viewer in the captured video image;

compares the identified at least one facial expression, posture or gesture with a stored first plurality of facial expressions, postures or gestures that indicate favoritism and a stored second plurality of facial expressions, postures or gestures that indicate disfavor;

determines that the viewer has the preference for the first team when the identified at least one facial expression, posture or gesture corresponds to one of the stored first plurality of facial expressions, postures or gestures; and determines that the viewer has the preference for the second team when the identified at least one facial expression, posture or gesture corresponds to one of the stored second plurality of facial expressions, postures or gestures.

16. The media device of claim 14, further comprising:

the microphone that captures an audio clip of sounds made by the viewer when the first neutral viewpoint video content segment is presented, wherein the processor system:

identifies at least one audio content characteristic from the audio clip;

compare the identified at least one audio content characteristic with a stored first plurality of audio content characteristics that indicate favoritism and a stored second plurality of audio content characteristics that indicate disfavor;

determines that the viewer has the preference for the first team when the identified at least one audio content characteristic corresponds to one of the stored first plurality of audio content characteristics; and determines that the viewer has the preference for the second team when the identified at least one audio content characteristic corresponds to one of the stored second plurality of audio content characteristics.

17. The media device of claim 14, further comprising:

the microphone that captures an audio clip of sounds made by the viewer when the first neutral viewpoint video content segment is presented, wherein the processor system:

identifies a volume level from the audio clip;

compares the identified volume level with a stored volume level threshold; and determines that the viewer has the preference for the first team when the identified volume level is at least equal to the volume level threshold.

18. The media device of claim 14, further comprising:

the microphone that captures an audio clip of sounds made by the viewer when the first neutral viewpoint video content segment is presented, wherein the processor system:

identifies at least one key word from the audio clip;

compares the identified at least one key word with a stored first plurality of key words that indicate favoritism and a stored second plurality of key words that indicate disfavor;

determines that the viewer has the preference for the first team when the identified at least one key word corresponds to one of the stored first plurality of key words; and determines that the viewer has the preference for the second team when the identified at least one audio key word corresponds to one of the stored second plurality of key words.

19. The media device of claim 14, further comprising:
a digital video recorder (DVR) that stores the received sporting event production,
wherein the processor system retrieves the stored sporting event production from the DVR, and
wherein at least one of the neutral viewpoint video content segment, the first team alternative video content segment or the second team alternative video content segment are presented to the viewer as the sporting event production is being retrieved from the DVR.

20. The media device of claim 14, further comprising:
a remote control interface that receives a wireless signal from a remote control, wherein the wireless signal is generated in response to the viewer actuating a predefined one of a plurality of controllers of the remote control,
wherein the processor system presented one of the neutral viewpoint video content segment, the first team alternative video content segment or the second team alternative video content segment only in response to receiving the wireless signal from the remote control.

* * * * *